United States Patent
Sakai

[11] Patent Number: 6,146,548
[45] Date of Patent: Nov. 14, 2000

[54] NOCTILUCENT OR FLUORESCENT ARTIFICIAL STONE

[75] Inventor: Mieko Sakai, Tokyo, Japan

[73] Assignee: Doppel Co., Ltd., Tokyo, Japan

[21] Appl. No.: 09/171,215

[22] PCT Filed: Feb. 17, 1997

[86] PCT No.: PCT/JP97/00417

§ 371 Date: Dec. 15, 1998

§ 102(e) Date: Dec. 15, 1998

[87] PCT Pub. No.: WO98/35919

PCT Pub. Date: Aug. 20, 1998

[51] Int. Cl.[7] .................... C04B 26/02; C04B 14/02; C04B 14/06; C04B 14/22; C08J 5/00
[52] U.S. Cl. .................. 252/301.36; 252/301.34; 252/301.35; 252/301.4 R; 252/301.3 R
[58] Field of Search .................. 252/301.36, 301.4 R, 252/301.35, 301.4 F, 301.34

[56] References Cited

U.S. PATENT DOCUMENTS

| | | | |
|---|---|---|---|
| 5,358,993 | 10/1994 | Timm et al. | 524/445 |
| 5,422,391 | 6/1995 | Inoue | 524/427 |

FOREIGN PATENT DOCUMENTS

| | | | |
|---|---|---|---|
| 6-228321 | 8/1994 | Japan . | |
| 8-119706 | 5/1996 | Japan . | |
| 2043673 | 10/1980 | United Kingdom | 252/301.36 |

*Primary Examiner*—C. Melissa Koslow
*Attorney, Agent, or Firm*—Wenderoth, Lind & Ponack, L.L.P.

[57] ABSTRACT

A noctilucent or fluorescent artificial stone comprising a mixture of a resin and 5–65 wt % with respect to the total weight of the artificial stone of a transparent inorganic aggregate, on which a luminous or fluorescent substance emitting light accompanied by absorption of ultraviolet rays, is baked, or coated.

10 Claims, 1 Drawing Sheet

NOCTILUCENT OR FLUORESCENT ARTIFICIAL STONE

TECHNICAL FIELD

The invention of this application relates to noctilucent or fluorescent artificial stone. More particularly, the invention of this application relates to artificial stone having noctilucent properties such as light storing properties or light emitting properties accompanied by ultraviolet ray absorption useful for building materials, materials for indication of position by emission of light in a dark environment, decorating materials etc.

BACKGROUND ART

Hitherto, artificial stone is known to be produced by crushing natural stone, mixing this with resin, grinding and hardening. And, regarding this artificial stone, processes are known to produce stone materials therefrom having the appearance of marble, granite, etc., and furthermore such materials are superior in hardness, strength.

For improving the performance of such artificial stone, adding an optical function using a noctilucent substance as a light storing material, or a fluorescent substance of an ultraviolet ray emitting material, emitting light accompanied by ultraviolet ray absorption, has been proposed.

However, in the case of a conventional noctilucent, or fluorescent artificial stone, mentioned above, only a part of that binder resin component or aggregate exposed on the surface part of artificial stone functions to emit light. Thus, there was disadvantage that light storing material etc. contained inside the formed body of artificial stone does not function to emit light. Fluorescent materials are very expensive and since even the addition of a small quantity raises the total cost of artificial stone product about 3 to 10 times, conventional artificial stone containing internal fluorescent substances is not practical costwise.

On the other hand, if the amount of noctilucent or fluorescent substance is reduced for cost reduction, it follows that the function of light emission or light storage is impaired.

Therefore, in order to improve the light function of artificial stone, the realization of a new artificial stone superior in function and effect, being capable of sufficient light emission, by the use of less noctilucent or fluorescent substance of a light storing material, for cost reduction, has been desired.

DISCLOSURE OF INVENTION

Accordingly, this invention seeks to solve the above-mentioned problem, by providing an artificial stone containing inorganic aggregate and resin, with the noctilucent or fluorescent material comprising at least part of the inorganic aggregate. The composition contains at 5 to 65 wt % of total amount, of a transparent inorganic aggregate, baked or normal temperature coated on its surface with a noctilucent substance of a light storing material, or a fluorescent substance having light emitting properties accompanied by ultraviolet ray absorption.

BEST MODE FOR CARRYING OUT THE INVENTION

Figure 1:
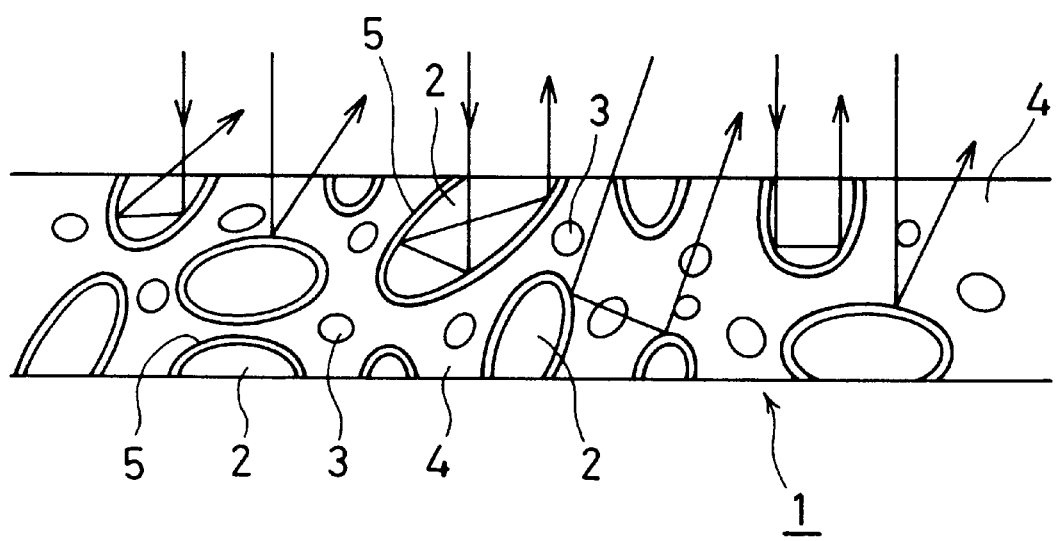
FIG. 1 of the attached drawing is a sectional view which illustrates the construction of the artificial stone of this invention.

The invention is described in more detail below.

The artificial stone, in this invention, contains as the basic component, inorganic aggregate and resin and, at least a part of the incorporated inorganic aggregate is a transparent inorganic aggregate having surface coating layer consisting of a noctilucent or fluorescent substance at 5 to 65 wt % of the total amount of artificial stone composition.

In the case of this amount being less than 5 wt %, sufficient light emitting properties, particularly, good light emission thickness is not obtained. And, in the case of exceeding 65 wt %, it is not economical in relation to light emitting properties.

Regarding the inorganic aggregate itself, it may not be only a transparent one, but in general, an inorganic aggregate incorporated at more than 5 wt %, preferably 10 to 90 wt %, and further preferably 20 to 80 wt %. It should be a transparent inorganic aggregate coated with noctilucent or fluorescent substance.

Incidentally, as to the size (particle diameter) of the inorganic aggregate, the following two kinds are exemplified as the preferred ones. That is, one is an inorganic small particle component of 5 to 70 mesh is employed as the main component. Adequate inorganic small particle components are selected from minerals of silicastone, olivine, feldspar, pyroxene, and mica, etc., natural stone of granite metamorphic rocks, etc., porcelain, glass, metal, etc.

And, together with this small particle component, a fine particle component of under 100 mesh is preferably used. As this fine particle component, natural or artificial fine particles of various kinds are enumerated. For example, calcium carbonate, aluminum hydroxide, silicastone powder, etc. are fine particle components obtained easily.

Also, as part of this fine particle component, it is permissible to add maganese dioxide, titanium dioxide, zirconium silicate, iron oxide etc. for the adjustment of color tone, or antimony trioxide, boron compounds, bromine compounds, etc. to impart flame retardance/nonburning properties.

The above-mentioned small particle component functions as a principal factor for the appearance and physical properties of artificial stone to be obtained. The exposed part, particularly, when combined with other components, becomes a principal factor in color and pattern.

And, regarding this small particle component, in this invention, it is essential to use one with at least part being transparent, and baked or normal temperature coated with a noctilucent substance of light storing properties, or a fluorescent substance having light emitting properties accompanied by ultraviolet ray absorption on its surface. In other words, a part or the entire amount of small particle component should be transparent inorganic aggregate whose surface is coated with noctilucent substance or fluorescent substance. As the small particle component of the inorganic aggregate with such transparency, glass and silicastone etc. are exemplified as adequate.

Regarding small particle components to be incorporated into composition, it is desirable to make the amount by (weight) as 10 to 100% of the transparent inorganic aggregate having a surface coating layer of the above-mentioned noctilucent substance or fluorescent substance.

Also, the fine panicle component is one which is considerably smaller than 100 mesh level (Tyler) in comparison with the small particle component, and enters between the individual particles of small particle component, filling the space between the small particles and contributes to obtaining such properties as hardness and flexibility of the artificial stone obtained. It is preferable to make the small particle component and this fine particle component 0.5 to 5:1, further 1:1 to 4:1 in weight ratio.

Also, the resin component can be selected from a broad range among thermosetting ones.

For example, acrylic resin, methacrylic resin, unsaturated polyester resin, etc. are exemplified. Of these, methacrylic resin is exemplified as being adequate from the standpoint of hardness, strength, etc. It is desirable that the formulation ratio of resin component is less than 15 wt %, further not higher than 10 wt % of the composition in all. This resin component has the function to wrap these small particles to form the above-mentioned skeleton and fine particles to contribute to the whole, to impart elasticity or tensile strength to the product when the artificial stone has been completed.

Therefore, the amount of inorganic aggregate consisting of the small particle component and fine particle component is restricted. That is, it should be not lower than 85%, preferably not lower than 90%, by weight. Incidentally, if it exceeds 95%, the product becomes brittle and it is only possible to obtain one hard to use. Also, if it is less than 85%, the product is so soft that stone-like properties are not obtained and the use range undesirably comes within the same range as resin plates.

This implies that the resin component should not exist in excess of weight of 15% at most in the product.

If the resin component exceeds 15% or so, the product becomes plastic-like and the artificial stone merely becomes marginal in appearance. Also, reducing the resin component excessively has the side effect of increasing appearance properties close to the natural color of the product but the product becomes brittle and unsuitable for use. From this point of view, more preferably, resin component should be 3 to 10 wt %.

In the embodiment of this invention, the constitutional ratio of these components is important. What is particularly important is the constitutional ratio with the resin component and other components. In this invention, it is a feature to make possible a high density product having a compact structure. High density here means that the small particle component and fine particle component contained in artificial stone product exist at high density. Its degree, for example, exceeds the range contained in conventional artificial stone, such as higher than density 2.2 g/cm$^3$.

And, in this invention, at least part of the small particle component which is a skeleton component, is baked with or normal temperature coated by noctilucent substance or fluorescent substance as mentioned above, as a feature of the embodiment.

In the transparent inorganic aggregates, particularly having a baked coating of small particle components, the particle surface of the transparent small particle components is coated with several $\mu$m to several tens $\mu$m, for example, 5 to 50 $\mu$m, more preferably 20 to 40 $\mu$m. To be more concrete, it is possible to carry out coating by baking at high temperatures of 120 to 1200° C. or so.

The noctilucent substance or fluorescent substance to be baked may be selected from the group comprised of noctilucent substances shining with the stored light and fluorescent substances emitting light by ultraviolet ray irradiation or light absorbing properties such as strontium aluminate, zinc sulfate, etc.

It is possible to mix, dry and bake transparent inorganic aggregates, for example, the above-mentioned small particle component in a dispersion solution or paste in which one has dispersed, for example, powder or granules of light storing material of strontium aluminate etc.

In coating by normal temperature coating, it is possible to use transparent sticky substances (binders) for the above-mentioned dispersing solution or paste.

Incidentally, in this invention, as mentioned above, it is desirable to make the size of the inorganic small particles component a specific one. That is, the inorganic small particle component should be 5 to 70 mesh (Tyler) as mentioned above. In the case where one wants to add color, using particles having color and particles having no color, it is conceivable to change the size of small particles by the presence or absence of color, however an extreme difference should not be used because it deteriorates the strength of the product.

On the other hand, the size of the fine particle component should be under 100 mesh as mentioned above. It should be sufficiently fine so as to be able to enter between particles of the small particle component. To be more concrete, those of 150 to 250 mesh are preferable.

However, this invention is not restricted to compositions to formulate inorganic aggregate divided into small particle components and fine particle components as mentioned above.

Incidentally, what is important in the high density artificial stone of this invention, except for special cases, is that these inorganic aggregated components are uniformly dispersed in any part of the product.

And, it is desirable that the external surface of product is polished or roughened. In practice, it is preferable to make it such that broken small particles are exposed.

Polishing is a practical and convenient method to surface expose the dense structure state of the high density artificial stone with depth feel that this invention possesses. Of course, is it possible to polish part of the surface of the product, exposing the small particle component, to use as a pattern the difference between other parts of the same surface.

Also, in the case of obtaining artificial stone, it is important to make any one of the intended color tones or design properties. Granite or marble becomes one target because it is difficult to obtain such product from natural ones and the color luster is beautiful. In this invention, using transparent one as a small particle component, it is possible to obtain one having luster of granite tone or marble tone, etc. This is because it is possible to use small particles obtained by crushing quartz-based natural stone as the small particle component.

Small particles obtained by crushing quartz-based natural stone are colorless and transparent in may cases. Even in the case of not being transparent, there are many which have some transparency.

By adding inorganic dye, or organic pigment e.g. azo pigment, phthalocyanine pigment, etc., or various dyes, it is possible to have unique color tone having uniform color, depth, and luster.

Incidentally, in the artificial stone composition of this invention, it is also possible to impart color to the product, by mixing and using the particulate colored one of the approximately same size as the small particle component, as the color component.

In any event, it is possible to easily secure the reproducibility of color as compared with conventional artificial stone. Thus, one without color change, superior in depth and luster is obtained.

The high density artificial stone of this invention having light storing properties and ultraviolet ray light emitting properties as well as superior color tone may be made arbitrarily rod-like, cylinder-like etc. in its shape.

Molding methods for this are variously selected, for example, cast molding, compression molding, etc. are properly considered.

In the compression molding method, to the lower receiving mold as the horizontal mold frame, a casting material (mixed material) after molding completion is the small particle component, fine particle component and resin component. The lower mold is mated with the upper mold, pressing with a surface pressure of 5 to 100 kgf/cm$^2$, performing compression molding. And in this molding, at the time of compression, one heats at temperatures of about 90 to 140° C. for about 5 to 20 minutes.

And, in this compression molding with heating, it is also possible to add vibration to the mold frame together with pressure, improve the flowabiltity of the above-mentioned mixing material in the mold frame.

Such compression molding method is suited for mass production for a comparatively simple shapes like plate-like molded articles, and is economically superior because there is almost no loss of material.

And, in this invention, it is permissible to perform roughening on the formed body surface after molding, so that the fine particle components are exposed on the surface part.

As the method for this, at first, the selective removing method of resin component is adopted. That is, for example, it is effective to perform surfacing fabrication by jetting high-pressure water to the surface of molded product after demolding from molding dye.

This fabrication is not limitative because it differs depending on various conditions of thickness, distance from the nozzle, fabrication mode, etc. Usually, in the case of a thickness of 2 to 20 cm, it is possible to employ a hydraulic pressure of 50 to 1400 kg/cm$^2$ with the height of the nozzle of about 2 to 50 cm. This pressure becomes a water pressure condition lower than the case where natural stone is the object.

Thus, by the presence of the resin component, the fabrication with high quality becomes possible more easily.

Regarding the nozzle and its system to jet high-pressure water, there are no specific restrictions. Those of various kinds are adopted.

By this surfacing fabrication, flattening or roughening by water jet is realized, and artificial stone having texture with depth is produced.

By the presence of the resin component, without the surface becoming whitened, and as compared with the etching method using chemicals, the disposal of waste liquid also becomes easy.

Of course, according to need, it is possible to treat the surface part with organic solvent, to soften or melt and partly remove the resin component.

As the organic solvent in this case, it is permissible to select one in response to the resin component to be used, for example, halogenated hydrocarbons such as methylene chloride, methylene chloride, chloroform, etc., carboxylic acids and its ester such as acetic anhydride, ethyl acetate, butyl acetate, etc., or acetone, tetrahydrofuran, DMF, DMSO, etc. are exemplified.

The forming body is immersed in these organic solvents or sprayed or poured with these organic solvents so that the softened or melted resin component is removed form the surface part, and thus it is possible to form surface irregularities.

Or also, it is permissible to form irregularities in such a way as to scrape form the surface part the resin component whose hardness is low by wire brush, grinding means, etc.

After roughening and surface fabrication by the above-mentioned various means, by polishing the surface as mentioned above, the coating layer of small particle component of surface is partly broken, this coating layer and particles of small particle component are caused to be exposed as a cross section on the surface part of the product. By this, a surface texture with unique depth and luster is realized. This is attributable to the unique reflection phenomenon of light as mentioned above.

The means for surface polishing is not specifically limited, and it is possible to perform it using tools such as grinding stone, abrasive cloth, abrasive belt, or using abrasive materials e.g. buffing abrasive material, rubbing compounds, etc.

As the abrasive material, diamond, boron carbonate, corundum, alumina, and zirconia which perform mainly grinding action, and tripoly, dolomite, alumina, chromium oxide, cerium oxide, etc. which perform mainly polishing action, are properly used.

Of course, after performing such polishing, it is permissible to further roughen the surface part and form irregularities. However, in this case, too, as mentioned above, particles of at least part of the small particle component and the cross section of its coating layer should be exposed.

By doing it in this way, artificial stone having superior light emitting properties as well as superior skin and texture is manufactured.

FIG. 1 of the attached drawing is a sectional view illustrating artificial stone (1) of this invention. For example, as FIG. 1 shows, artificial stone (1) is constructed of small particle component (2) as transparent inorganic aggregate, fine particle component (3) of smaller particle diameter, and resin component (4) as binder.

On the surface of small particle component (2) light storing or ultraviolet ray light emitting substance is baked and coated and the surface of artificial stone (1) is polished.

In this construction, the light irradiated from the outside reaches the baked coating substance (5) inside, and in the case of using resin component (4) methacrylic resin (MMA resin) superior in transparency, it follows that light is incident to all regions of the thickness direction of artificial stone (1).

Therefore, it follows that incident light infiltrates to its inside and light emission from inside results. Thus, the absorption layer of light and the light emitting layer become thick. Therefore, light storing in a short time becomes possible and light emitting efficiency becomes large.

Since the coating is only on the surface of the small particle component, it follows that the amount of noctilucent or fluorescent substance used suffices in small amount.

In the following, we will explain the invention by reference to examples. Of course, this invention is not limited by the following examples.

EXAMPLES

Example 1

Initially, 50 wt % of the total small particle component was natural silicastone of particle diameter 10 to 25 mesh, provided in a thickness of about 30 μm with the surface baking layer at about 1000° C. using strontium aluminate-based light storing material. The small particle component and calcium carbonate of average particle diameter 230 mesh were used in a weight ratio 2:1, so that it becomes 89 wt % of the composition total weight, uniformly mixed into a mortar state together with methyl methacrylate (MMA) of 11 wt % containing hardening agent of about 1.5 wt % of MMA weight.

Casting this composition into a mold frame, a plate-like body of thickness about 15 mm was formed.

Then, polishing the surface part using diamond-based grindstone and silicon carbide magnesia-based grindstone, the small particle component having the baked coating layer, is caused to be exposed at the partial cross section of its baked layer.

The resulting artificial stone exhibited noctilucent light storing/light emitting characteristics in all thickness directions, possesses milky white color and luster of marble tone with even depth, no bubbles were present inside or on the surface and the composition was uniform.

In a test according to the Japanese Industrial Standard JIS K-7112, the specific gravity was 2.29. And, water absorption was 0.13%. Other characteristic properties were as in Table 1 below.

TABLE 1

| Item | Results | Test condition |
| --- | --- | --- |
| Flexural strength | 31.30 kgf/cm | according to JIS A5209 |
| Compressive strength | 1400 kgf/cm$^2$ | Crosshead speed 0.5 Mm/min load cell 2 ton |
| Impact strength | 4.58 kgf cm/cm$^2$ | Pendulum-type impact test |
| Hardness | 1021 kfg/mm$^2$ | Vickers hardness according to JIS Z-2244 |
| Coefficient of linear expansion | 0.65 (x 10$^{-5}$K) | TMA (30 to 100° C.) |
| Wear resistance | 0.03 g | JIS A5209 sand dropping type wear resistance test |

And, anomalies were not recognized by the acid resistance and, alkali resistance test using 3% hydrochloric acid aqueous solution with 8 hours immersion and 3% sodium hydroxide aqueous solution with 8 hours immersion.

Using the obtained product as wall board of buildings, it was possible to obtain walls of beautiful granite tone having depth.

Example 2

Initially, 40 wt % of the total small particle component was transparent glass of particle diameter 5 to 50 mesh, provided in a thickness of about 40 μm with the surface baking layer at about 700° C. using strontium aluminate-based light storing material. The small particle component and natural silicastone powder of average particle diameter 250 mesh are employed in a weight ratio 2:1, so that it becomes 87 wt % of the composition total weight, uniformly mixed into a mortar state together with methyl methacrylate (MMA) of 13 wt % (the one containing peroxide-based hardening agent of 2.0 wt. % of weight). Then pressure heating molding, was performed to produce a plate-like body of thickness 12 mm.

Then, the surface part was polished using diamond grindstone and silicon carbide magnesia-based grindstone, further removing only the resin part of the surface part with a water jet pressure of 1100 kg/cm$^2$ (nozzle diameter 0.75 mm, jet distance 40 mm).

The obtained artificial stone has depth and non-slip function, and at night it was visible for a long time in all thickness directions by the light storing properties.

It was possible to use the artificial stone as a noctilucent guide post building material in the event of emergency electrical failure.

INDUSTRIAL APPLICABILITY

As mentioned above, in this invention, high density artificial stone superior in light characteristics of noctilucent properties etc. and having depth and luster, and good characteristic properties is provided. Moreover, the production of such superior product is realized at far lower cost compared with conventional products.

What is claimed is:

1. An artificial stone comprising resin and inorganic aggregate (A) comprising transparent inorganic aggregate (A1) and non-transparent inorganic aggregate (A2), wherein A=A1+A2, said transparent inorganic aggregate (A1) comprising aggregate baked or coated with a noctilucent or fluorescent substance (A11), the latter emitting light accompanied by absorption of ultraviolet rays and non-coated aggregate (A12), wherein A1=A11+A12 and wherein at least part of inorganic aggregate (A) is transparent inorganic aggregate baked or coated with noctilucent or fluorescent substance (A11), and the content of this aggregate (A11) in the artificial stone (total amount B) is 5 to 65 wt %, and wherein (A11/B)×100=5 to 65 wt %.

2. Artificial stone of claim 1, wherein the transparent inorganic aggregate is glass or silicastone.

3. The artificial stone according to claim 1 wherein the ratio of (A11/A)×100 is 20 to 80 wt %.

4. Artificial stone of claim 1, wherein the resin is methacrylic resin.

5. The artificial stone of claim 1 wherein inorganic aggregate (A) comprises small particle component (Aa) of 5 to 70 mesh and fine particle component (Ab) of under 100 mesh; wherein A=Aa+Ab and at least part of said the small particle component (Aa) is baked or coated with noctilucent or fluorescent substance (A11).

6. Artificial stone of claim 5, wherein 10 to 100% (weight) of the small particle component (Aa) is transparent inorganic material baked or coated at room temperature coated with a noctilucent or fluorescent substance on the surface.

7. Artificial stone of claim 5, wherein the weight ratio of small particle component (Aa) to fine particle component (Ab) is 1:1–4:1.

8. Artificial stone of claim 1, wherein the thickness of the coating layer of the noctilucent or fluorescent substance is 5 to 50 μm.

9. Artificial stone of claim 1, wherein the amount of the resin is less than 15 wt %.

10. Artificial stone of claim 9, wherein the ratio of the resin is less than 10 wt %.

* * * * *